Figure 1:
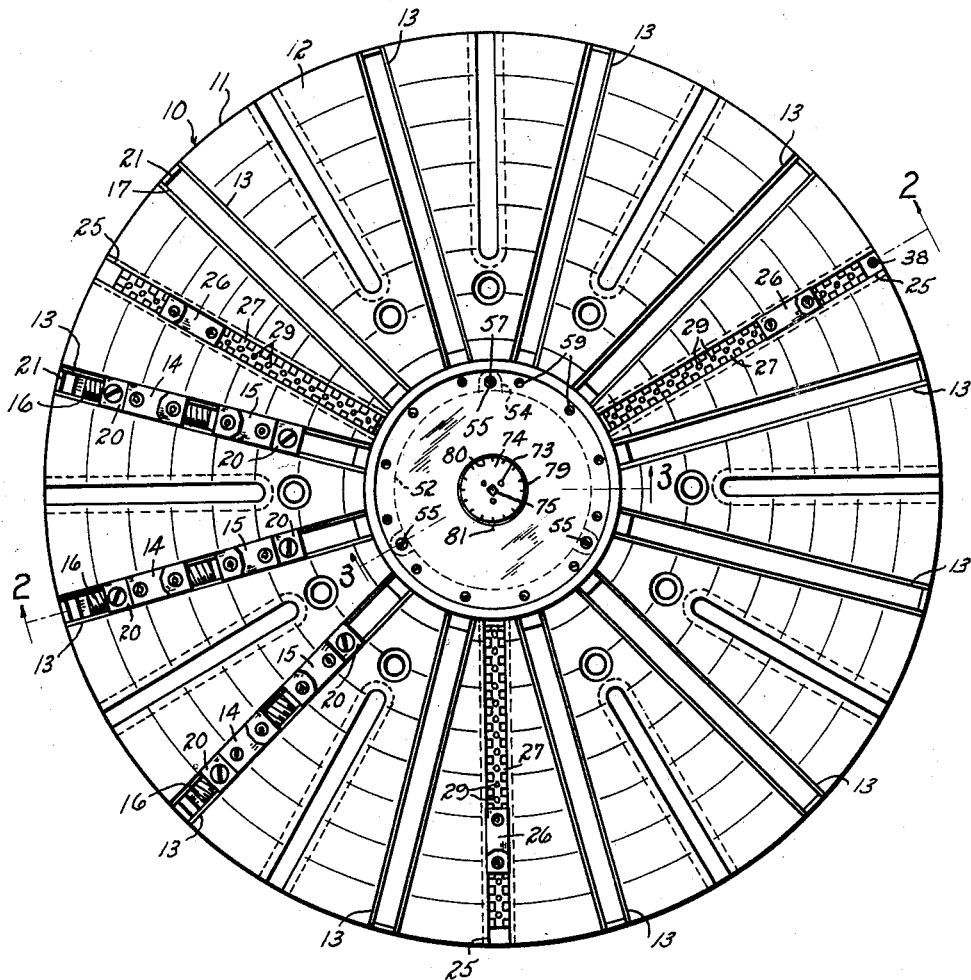

Sept. 22, 1959 W. H. BRAINERD 2,905,476
CONTROLLED CENTERING CHUCK
Filed Dec. 28, 1955 3 Sheets-Sheet 1

INVENTOR.
WILLIAM H. BRAINERD
BY
*Lindsey and Prutzman*
ATTORNEYS

Sept. 22, 1959  W. H. BRAINERD  2,905,476
CONTROLLED CENTERING CHUCK
Filed Dec. 28, 1955  3 Sheets-Sheet 2

INVENTOR
WILLIAM H. BRAINERD

BY *Lindsey and Prutzman*
ATTORNEYS

Sept. 22, 1959   W. H. BRAINERD   2,905,476
CONTROLLED CENTERING CHUCK
Filed Dec. 28, 1955   3 Sheets-Sheet 3

INVENTOR
WILLIAM H. BRAINERD

BY *Lindsey and Prutzman*
ATTORNEYS

United States Patent Office 2,905,476
Patented Sept. 22, 1959

2,905,476

CONTROLLED CENTERING CHUCK

William H. Brainerd, Windsor, Conn., assignor, by mesne assignments, to United-Greenfield Corporation, a corporation of Delaware Application December 28, 1955, Serial No. 555,819

11 Claims. (Cl. 279—116)

This invention is concerned with chucks, and particularly with a pinch type chuck having means to control or limit the centering pressure thereof.

The need has been felt for a long time in the metal working industry, particularly in the sheet metal field, for a chuck by means of which a thin-walled, large diameter work piece can be accurately centered for subsequent machine operations without distortion of the piece. In the use of a scroll chuck, wherein a plurality of simultaneously and radially movable jaws serve to center and hold the piece on the chuck, the machine operator frequently determines the extent of the radial movement of the jaws by the use of a torque wrench in an attempt to minimize distortion of the piece. In such an operation the operator must firmly engage the jaws with the piece to assure accurate centering yet he must carefully avoid the application of excessive force for if excessive force is radially imposed on a piece such as a thin-walled tube, distortion of the piece may occur which will later cause scrapping of the part. Therefore, the set-up of the piece on the chuck requires that the operator be particularly skilled in this operation in order to assure consistently satisfactory results.

A further problem sometimes encountered in the use of a conventional scroll chuck is that uneven wear on the faces of the jaws may throw the jaw faces out of concentricity with the axis of rotation of the chuck with the result that a work piece may not be precisely concentric with the axis of rotation of the chuck after being centered by the jaws. One method used to correct this deficiency is to place a shim between the jaw face and the work piece, but naturally it is very difficult if not impractical to have available a shim or shims precisely equal to the variance in concentricity of the jaw faces. Here again the selection of the proper shim or shims and their placement requires the services of a skilled operator.

It is therefore an object of this invention to provide a chuck for the machining of thin-walled large diameter work pieces having means whereby the force imposed on the wall of the work piece by the operator in centering the work piece on the chuck may be effectively limited or controlled.

Another object of this invention is to provide a chuck as described whereby the level of the maximum force which may be applied to the work piece in the centering operation may be varied.

It is still another object of this invention to provide a chuck as described having indicator means whereby an operator may easily determine the maximum force which may be applied for the centering operation.

It is further an object of this invention to provide a chuck as described having means whereby the concentricity of the faces of the centering jaws may be easily adjusted without the use of shims or the like and further may be adjusted while the work piece is in place.

It is still further an object of this invention to provide a chuck as described above which will permit operation by an unskilled worker with consistently accurate results.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2A:
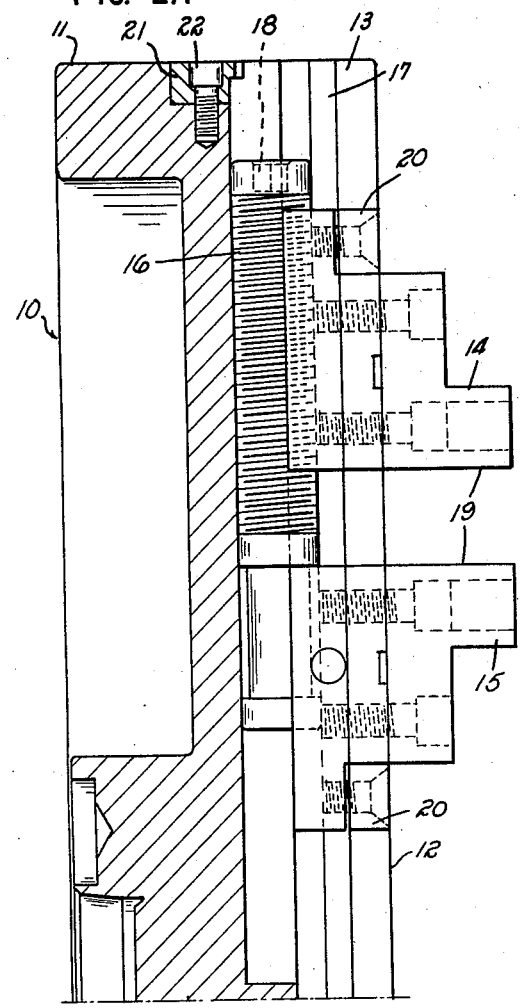
Figure 2B:
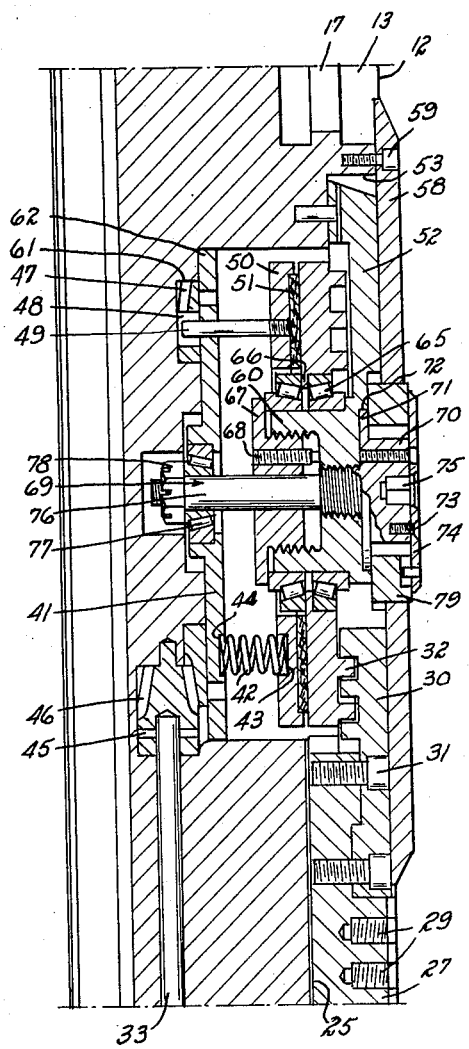
Figure 2C:
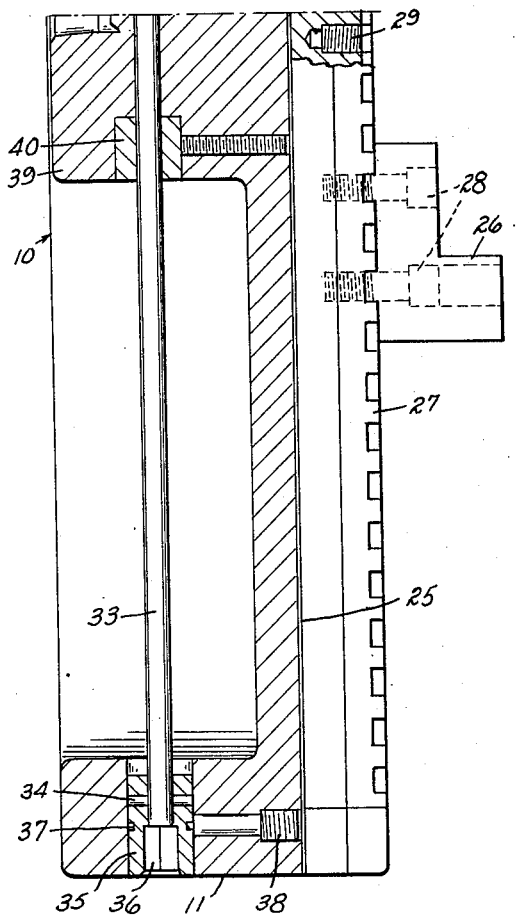
Figure 3:
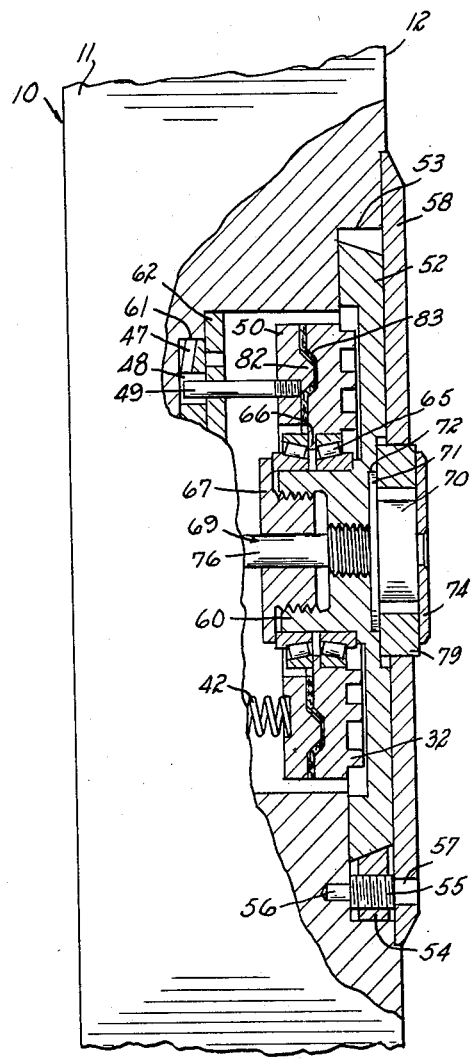

In the drawings:

Fig. 1 is a front view of a chuck embodying the centering force limiting means of the present invention;

Figs. 2a, 2b and 2c are partial cross-sectional views of the chuck of Fig. 1 along the lines 2—2 of Fig. 1; and Fig. 3 is a fragmentary sectional view of the chuck of Fig. 1 along the lines 3—3 illustrating in part a modification of the centering force limiting means.

With reference to the drawings, and particularly Fig. 1, the chuck shown therein and constructed in accordance with this invention is comprised of a body 10 having a peripheral wall or face 11, and a front face 12. A series of symmetrically arranged and radially extending grooves 13 are provided on the front face of the chuck each for the mounting of independent pairs of work-holding jaws 14 and 15. For simplicity only three pairs of jaws have been shown in Fig. 1 of the drawings, however, it is to be understood that one pair of such jaws would preferably be mounted in each of the grooves 13. The independent jaws 14 and 15 provide a means to retain the work piece on the chuck during machining. With reference to Fig. 2 of the drawings, it can be seen that an operating screw 16 is slidably mounted in each of the grooves 13 and is retained therein by means of a block 21 disposed at the outer end of the grooves and secured to the chuck by a screw 22. Shoulders 17 along the sides of the grooves 13 provide tongues for reception into correspondingly shaped grooves in the sides of the jaws 14 and 15 to provide a guide means for the radial travel of the jaws. The jaw 14 has on its under side a threaded portion mating with the thread of the operating screw 16. The inner jaw 15 has on its under side an axially extending concave recess mating with an axially extending annular groove on the inner end of the operating screw 16. A wrench socket 18 is provided in the outer end of the screw 16 so that with a work piece inserted between the faces 19 of the jaws 14 and 15, and for example, in contact with the face of the jaw 15, the operating screw may be turned to bring the jaw 14 into clamping engagement with the work piece. If, on the other hand, the outer jaw 14 is in contact with or comes into contact with the working piece before the jaw 15, continued turning of the operating screw will cause the screw to move radially outwardly of the chuck, thus bringing the inner jaw 15 into clamping engagement with the work piece. As is apparent from the drawings, the entire independent jaw unit comprised of the jaws and the operating screw is slidable in the grooves 13, thus permitting the jaws to be positioned in proper position relative to the work piece before the work piece is centered on the chuck in the manner to be hereinafter described, and further permits the work piece to be subsequently clamped in place on the chuck without any distortion. Binder blocks 20 are provided in association with each of the jaws 14 and 15 to provide means for holding each of the pairs of jaws 14 and 15 in the desired position relative to the work piece prior to centering of the work piece as well as to permit locking of the jaws in work piece engagement position prior to machining the piece. As seen in Figs. 1 and 2A, each block 20 is fastened to the associated jaw 15 by a threaded fastener and rides on shoulders 17 of each groove 13. When the fastener is tightened, jaw 15 and block 20 clampingly engage groove 17 to fix the position of jaw 15 relative to body 10.

In the chuck of the present invention there is further provided on the face of the chuck a plurality of grooves 25 in which are mounted the centering jaws 26 for sliding movement radially of the chuck. In the preferred embodiment there are three such grooves and jaws provided at 120° intervals on the chuck face. However, it is to be understood that the number and angular positioning of the grooves and jaws could be varied to fit a specific cross-sectional shape. Each of the centering jaws 26 is mounted on a jaw extension 27 by means of screws 28 extending through the jaws into threaded apertures 29 in each extension. A series of such apertures 29 is provided along the length of each master jaw to permit variable prepositioning of the centering jaws. The jaw extensions 27 are slidably mounted in the grooves 25 by a conventional T-slot construction. Each of the jaw extensions 27 is provided with a toothed portion 30 mounted on its inner end by means of screws 31 for engagement by a scroll cam 32, the movement of which, in a manner to be hereinafter described, will simultaneously move the centering jaws radially of the chuck.

In accordance with this invention, a drive shaft 33 is mounted radially in the body of the chuck, as shown in Fig. 2, and is connected at its outer end by means of a pin 34 to a socket 35 rotatably mounted in the outer wall 11 of the chuck. The socket 35 is provided with a recess 36 constructed to receive a socket wrench by means of which the drive shaft may be rotated. The socket 35 has an annular groove 37 which is engageable by a lock screw 38 providing a means to retain the socket 35, within the body.

The drive shaft 33 is rotatably journaled in the body of the chuck at 39 in a bearing 40 and extends inwardly therefrom where at its inner end there is mounted by means of a pin 45, a pinion 46. The pinion 46 is in engagement with ring gear 47 rotatably seated in a recess 61 in the body of the chuck. The ring gear 47 is axially maintained in the recess 61 by means of the ring 62 in sliding engagement therewith and mounted in the body of the chuck by means of screws (not shown). A plurality of radial slots such as 48 are provided in the ring gear and in which are received driving stud or studs 49 threadably mounted in a pressure plate 50, which as shown in Fig. 2, is in driving engagement with the scroll cam 32 through the medium of a friction disc 51. The disc 51 is fabricated from a suitable friction material which will provide a driving connection between the driving plate 50 and the scroll cam 32 but which will permit the drive plate to slip relative to the scroll cam if sufficient torque is applied therebetween. The pressure plate 50 is maintained in engagement with the friction disc 51 by means of a plurality of springs 42 each having one end thereof mounted in a recess 43 in the rearward face of the pressure plate and the other end mounted in a recess 44 in the front face of a spring adjusting plate 41. The driving studs 49 extend through the adjusting plate 41 so that the adjusting plate will be rotated in response to any rotation of the ring gear 47. The scroll cam 32 is in engagement with the toothed portions 30 of the centering jaw extensions 27, which are slidably received in radially extending slots (not shown) in a hub plate 52 which, as best shown in Fig. 3, is retained in an annular groove 53 in the face of the chuck by means of a front plate 58 mounted to the front face of the chuck body by screws 59.

The periphery of the hub plate 52 is slightly beveled for engagement with the complementary beveled surfaces of a plurality of centering shoes 54. The centering shoes are provided with adjusting screws 55 rotatably mounted in the chuck body by means of extensions 56 and prevented from moving axially thereof by engagement with the front plate 58. In the preferred embodiment three such centering shoes are provided at 120° intervals about the chuck axis. Apertures 57 in the front plate 58 provide access means for the selective rotation of the centering screws 55.

The hub plate 52 is provided with an axial extension 60, on the periphery of which is rotatably mounted the scroll cam 32, by means of the thrust bearings 65. The scroll cam 32 is provided with an inwardly extending lip 66 which is engaged between the thrust bearings 65. The thrust bearings are retained by means of a threaded plug 67 received by a threaded recess in the inner end of the axial extension 60 of the hub plate. A set screw 68 is provided to lock the plug 67 in the desired rotated position.

Threadably received by the hub plate 58 is the drawscrew 69 which is provided with a hub 70 having a radially extending shoulder 71 rotatably mounted in a recess 72 in the hub plate. Mounted on the outer face of the hub 70 by means of screws 73 is a tension dial member 74, the purpose of which will be hereinafter described. A recess 75 is provided in alignment with the centerline of the drawscrew 69 and is constructed to receive a socket wrench for the adjustment of the drawscrew. The drawscrew 69 is provided with an unthreaded extension 76 extending through and rotatably journaled in the plug 67 and is journaled at its inner end in the bearing 77 mounted on the adjusting plate 41. The bearings 77 are held in proper bearing position by means of a nut 78 threadably received on the inner end of the drawscrew extension.

As should be apparent from the above description, taken in connection with the consideration of the drawings, when the drive shaft 33 is rotated in the proper direction the ring gear 47 will also be rotated, which through the driving studs 49 will rotate the pressure plate 50 and the adjusting plate 41. The pressure plate 50 will in turn through the medium of the friction disc 51 rotate the scroll cam 32 to move the centering jaws 26 radially of the chuck into engagement with a work piece. As also should be apparent, when excessive force is applied to the drive shaft subsequent to engagement of the centering jaws with the work piece, the pressure plate 50 will slip relative to the scroll cam 32. This force is, of course, determined by the force of the springs 42 disposed between the adjusting plate 41 and pressure plate 50. This spring force may be varied by the threading outwardly of the drawscrew 69, so as to increase the compression of the springs 42 and, conversely, the force at which the pressure plate 50 will slip relative to the scroll cam 32 may be decreased by the threading inwardly of the drawscrew 69, in order to reduce the compressive load on the springs 42.

In Fig. 3 there is shown alternate means by which the yielding feature of the chuck may be accomplished. In this embodiment the driving engagement between the pressure plate 50 and the scroll cam 32 is by means of a plurality of detents, which in the specific embodiment comprise axially extending lugs 82 on the pressure plate which are received by a plurality of correspondingly shaped recesses 83 in the inner face of the scroll cam 32. The engaging surfaces (not shown) of the lugs and recesses are complementally beveled so that the application of sufficient torque between the pressure plate and scroll cam, subsequent to engagement of the centering jaws with the work piece, will cause the lugs to cam out of engagement with the recesses and thus the application of additional centering force on the work piece is prevented. As can be seen from a consideration of Fig. 3, there has been provided in this alternate construction means whereby the pressure plate 50 may move axially of the ring gear a distance sufficient to permit proper operation of the clutch or yieldable drive. There are other constructions which would accomplish the desired breakaway effect provided by the friction disc member or overriding lug construction disclosed herein, and the two methods shown are merely by way of example, and are not to be considered as limiting the scope of this invention.

In order to provide an indication to the operator of the disengaging force of the clutch, an indicator ring 79 is coaxially mounted between the tension dial member 74 and the hub plate 52, and is radially supported by the front plate 58. Indicia (not shown) may be placed on the periphery of the indicator ring, so that the operator may obtain a rough reading of the breakaway force of the chuck, inasmuch as the indicator ring will extend axially outwardly of the front place a predetermined amount for each setting of the compressive load of the springs 42. In order to provide a more precise determination or setting of the compressive force of the springs 42, the tension dial 74 has on its face, as can be seen in Fig. 1, a series of indicia 80 which are registerable with an index marking 81 on the front face of the front plate 58. The operator may, from a consideration of the indicia on the periphery of the indicator ring and the rotative relationship of the indicia 80 with the index marking 81, determine or precisely set the compression of the springs 42, and thus the breakaway force of the chuck.

If for any reason, after a work piece has been centered in the chuck by the centering jaws 26, the piece should not be concentric with the chuck, the work piece and centering jaws may be relocated relative to the axis of the chuck. This is accomplished by selectively threading each of the adjusting screws 55 of the centering shoes 54 inwardly or outwardly relative to the hub plate 52 in the sequence or pattern necessary to center the piece. This movement of the centering shoes will, due to the beveled face of the shoes and the correspondingly beveled periphery of the hub plate, relocate the hub plate with respect to the axis of the chuck. From a consideration of Figs. 2 and 3, it can be seen that the pressure plate, springs, adjusting plate, and drawscrew with its associated indicating elements are movable along with the hub plate and the centering jaws during the realignment operation to provide the particular advantage of a chuck embodying this invention; that concentricity of the centering mechanism may be established while a work piece is held by the centering jaws.

It can thus be seen that there has been provided a chuck having means for centering a thin-walled large diameter work piece with only that amount of force applied to the work piece which is necessary for the centering thereof, thus precluding the possibility of deforming the work piece by excessive centering pressure. The centering means of the chuck is simple in operation and may be set by an unskilled worker with the accuracy previously attainable only by a very skilled worker. The construction of the centering means is economical and simple, and yet is of rugged construction, assuring long trouble-free service.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a chuck, a rotatable chuck body, a plurality of work centering jaws slidably mounted on said body for movement radially thereof, centering jaw positioning means carried by the chuck body and connected to said centering jaws for simultaneous movement thereof, a plurality of relatively movable pairs of work holding jaws slidably mounted on said chuck body for movement radially thereof, and an operating screw connected to each of said pairs of work holding jaws and being rotatable to move the jaws of each of said pairs relative to each other, each of said pairs of jaws and associated operating screws being movable radially of the chuck as a unit to locate said work holding jaws in approximate work holding position prior to centering of the work by said centering jaws.

2. In a chuck, a rotatable chuck body, a plurality of angularly spaced apart work centering jaws slidably mounted on said body for movement radially thereof, driving means mounted on the interior of said chuck body, means connecting the driving means to said centering jaws for effecting simultaneous movement thereof relative to said body, said last named means including a yieldable drive member, a plurality of pairs of work holding jaws slidably mounted on said body for movement radially thereof, both jaws in each of said pairs being disposed on the same side of the axis of said body and being movable relative to each other, an operating screw engaged with each of the jaws in each of said pairs of jaws for movement of the jaws of each pair relative to each other, and means engageable with said chuck body and carried by each of said pairs of jaws to position said pairs of jaws radially of the chuck in approximate work holding position prior to centering of the work by said centering jaws.

3. In a chuck, a chuck body, a plurality of jaws mounted on said chuck body for movement radially of the chuck, rotatable means carried by the chuck body and engaging the jaws for simultaneously adjusting the radial position of said jaws, rotatable driving means mounted on the interior of said chuck body for driving said rotatable means, and means forming a yieldable connection between said driving means and said rotatable means.

4. In a chuck, a chuck body, a plurality of radially movable jaws mounted on said chuck body, rotatable means connected to the jaws to simultaneously adjust the radial position of said jaws, said rotatable means being mounted in said chuck body, rotatable driving means mounted on the interior of said chuck body for actuating said rotatable means, and a torque limiting yieldable coupling operatively connecting said driving means and said adjusting means, said coupling being provided with adjustable means to vary the maximum torque transmittable by said yieldable drive member.

5. In a chuck, a chuck body, a plurality of radially movable jaws mounted on said chuck body, rotatable cam means engaging the jaws to simultaneously adjust the radial position of said jaws, said rotatable means being supported on said chuck body, driving means carried by the chuck body to actuate said rotatable cam means including a rotatable drive member mounted concentrically of said rotatable cam means, and a yieldable friction coupling disposed between and operatively connecting said rotatable drive member and said rotatable means.

6. In a chuck, a chuck body, a plurality of radially movable jaws mounted on said chuck body, a rotatable member mounted on said chuck body and connected to the jaws for simultaneously adjusting the radial position of said jaws, rotatable driving means to actuate said rotatable member supported by said chuck body and including a rotatable plate member mounted concentrically of said rotatable member for limited movement axially of said rotatable member, a yieldable driving connection between said plate member and said rotatable member including interengaging cam surfaces on said rotatable member and plate member for moving said plate member out of driving engagement with the rotatable member, and a spring urging said plate member toward said rotatable member.

7. In a chuck, a rotatable chuck body, a rotatable cam member mounted on said chuck body concentrically of the axis of rotation of said chuck body, a plurality of radially movable jaws mounted on said chuck body and engaged with the cam member for movement in response to rotation of said cam, and driving means carried by the chuck body for actuating said cam comprising a rotatable plate member disposed concentrically of said rotatable cam, means forming a yieldable driving connection between said plate member and said cam member including a detent carried by one of the members engageable with a cooperatively shaped recess in the other member, spring means urging said detent into engagement with said recess, and means to selectively vary the force of said spring means.

8. In a chuck, a rotatable chuck body having a front face, a cam rotatably mounted on said chuck body concentrically of the axis of rotation of said chuck body, a plurality of radially movable jaws mounted on the front face of said chuck body and engaged with the cam for movement in response to rotation of said cam, and driving means carried by said chuck body for rotating said cam comprising a rotatable plate mounted on the interior of said chuck body concentrically of said rotatable cam, a yieldable driving connection between said plate and said cam, a spring urging said plate toward said cam, and a member mounted on said chuck body for movement relative to said chuck body, means connecting said member to said spring to provide selective adjustment of the force exerted by said spring on said cam, a portion of said member extending beyond the front face of the chuck body to permit adjustment of the force of the spring from the exterior of the chuck.

9. In a chuck, a rotatable chuck body, a plurality of jaws mounted on said chuck body for movement radially of said chuck body, a mounting plate supported by said chuck body concentric with the rotational axis thereof, a cam rotatably mounted on said mounting plate and engaged with said jaws to simultaneously move said jaws, driving means supported by said chuck body for rotating the cam, a yieldable coupling between the driving means and the cam, and adjustable means supported by said chuck body and engaging the mouting plate to selectively move said mounting plate radially of said rotational axis.

10. In a chuck, a rotatable chuck body, a plurality of jaws mounted on said body for movement radially of the chuck, a circular mounting plate having a bevelled peripheral surface mounted on said chuck body concentric with the rotational axis thereof, an axial extension on said mounting plate, a cam rotatably mounted on said axial extension and operatively connected to said jaws to simultaneously move said jaws, driving means supported on said chuck body for selectively rotating said cam, means including a yieldable drive member operatively connecting said driving means and said cam, and a plurality of shoe members adjustably mounted on said chuck body for selective movement axially of said mounting plate, each of said shoe members having a surface bevelled in a complementary manner and in engagement with the bevelled peripheral surface of said mounting plate.

11. In a chuck, a chuck body, a mounting plate disposed concentrically of and supported by said chuck body and having a hub portion extending axially of said chuck body, a scroll cam rotatably mounted on said hub portion, a plurality of jaws mounted on said chuck body for radial movement thereon, said jaws engaging said scroll cam for simultaneous movement thereby, a ring gear rotatably mounted on said chuck body concentrically of said scroll cam, means for selectively rotating said ring gear, and a yieldable coupling operatively connecting said ring gear with said scroll cam, said yieldable coupling comprising a pressure palte mounted for rotation with said ring gear concentrically of said scroll cam, an adjusting plate, means mounting said adjusting plate on said pressure plate for rotative movement therewith and axial movement relative thereto, a compression spring axially disposed between said adjusting plate and said pressure plate, and a draw screw threadably received in said hub portion of said mounting plate and extending inwardly of the chuck body into engagement with said adjusting plate whereby rotation of said draw screw adjusts the relative position of said pressure plate relative to said adjusting plate thereby to vary the pressure of said compression spring on said pressure plate.

References Cited in the file of this patent

UNITED STATES PATENTS

| | | |
|---|---|---|
| 1,238,546 | Manuel et al. | Aug. 28, 1917 |
| 2,363,709 | Vidal | Nov. 28, 1944 |
| 2,463,083 | Brownlee | Mar. 1, 1949 |
| 2,581,474 | Evangelista | Jan. 8, 1952 |
| 2,757,009 | Sloan et al. | July 31, 1956 |
| 2,757,010 | Sloan et al. | July 31, 1956 |

FOREIGN PATENTS

| | | |
|---|---|---|
| 939,062 | Germany | Feb. 16, 1956 |